March 17, 1931. E. S. INGRAHAM 1,796,790
ATTACHMENT FOR AUTOMATIC SCREW MACHINES
Filed Aug. 2, 1928 2 Sheets-Sheet 2
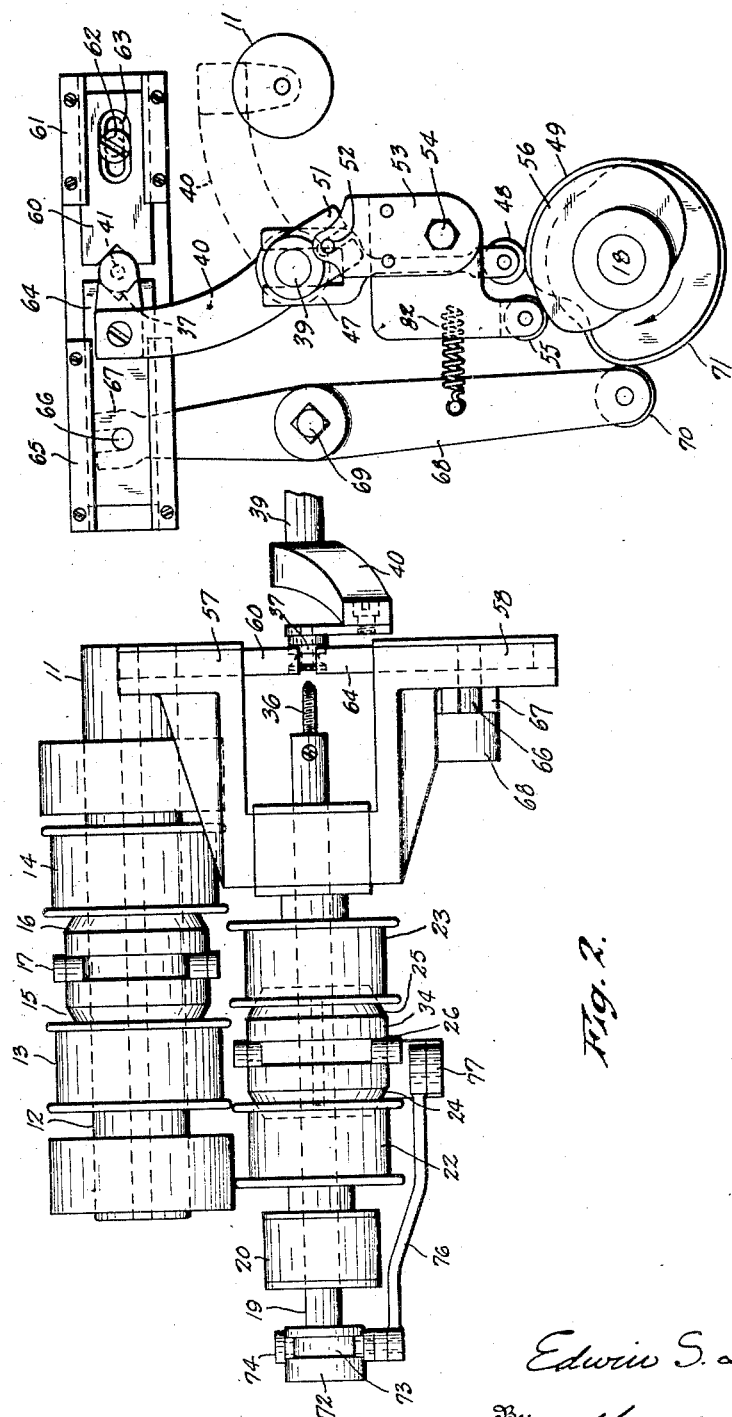
Inventor
Edwin S. Ingraham
By Wooster & Davis
Attorneys Patented Mar. 17, 1931

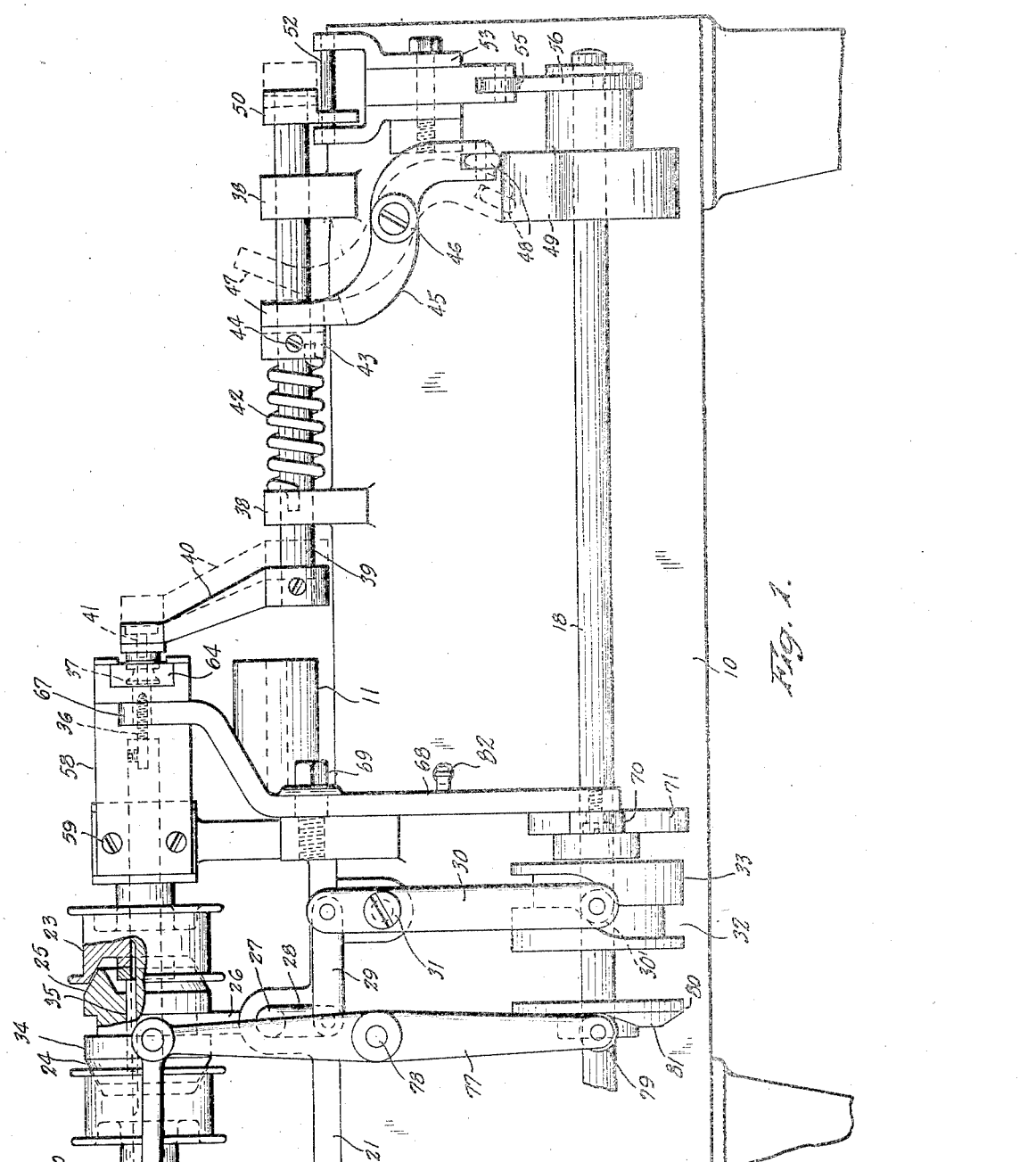

1,796,790

UNITED STATES PATENT OFFICE

EDWIN S. INGRAHAM, OF WATERBURY, CONNECTICUT, ASSIGNOR TO THE BLAKE AND JOHNSON COMPANY, OF WATERVILLE, CONNECTICUT, A CORPORATION OF CONNECTICUT

ATTACHMENT FOR AUTOMATIC SCREW MACHINES

Application filed August 2, 1928. Serial No. 296,876.

This invention relates to an attachment for automatic screw machines, particularly of the Brown and Sharpe type. In this type of machine it is difficult to perform certain operations on the articles being formed, especially such an operation as tapping these articles. Attempts have been made to perform tapping operations on the screw machine, but where this has been done production has been greatly reduced because of the great slowing down of the machine required to produce the reversing operation for withdrawing the tap. Nuts and similar articles have also been tapped on continuous taps used in connection with the screw machine, but this requires a special tap and operating device which is expensive and has not proved entirely satisfactory, and therefore, at the present time it is common practice to perform these operations on a separate machine called a "second operation machine". In performing these operations on the second machine, however, the articles had to be freed from chips, and also all had to be arranged in a certain way, and it, of course, involved the construction of the second machine and the use of the extra space required therefor.

It is, therefore, an object of my present invention to overcome these objections and provide an attachment for the automatic screw machine which will perform the additional operation in conjunction with the automatic screw machine, thus doing away with the separate or second operation and the extra work involved in the use of this machine.

It is also an object of the invention to provide an attachment which will perform these operations in conjunction with and in certain timed relation with operations of the screw machine, so that no cleaning operation is required to free the articles of chips and there is no operation required for arranging these articles.

It is also an object of the invention to provide an attachment which does not interfere in any way with the normal operation of the screw machine so that there is no curtailment of its production, and the separate operations are performed as rapidly as the work is completed on the screw machine.

With the foregoing and other objects in view, the invention consists in certain novel features of construction, combinations and arrangements of parts as will be more fully described in connection with the accompanying drawings. In these drawings, Fig. 1 is a side elevation of a portion of an automatic screw machine showing my improved attachment applied thereto.

Fig. 2 is a top plan view showing the arrangement of the two spindles, and

Fig. 3 is an end elevation looking from the right of Fig. 1.

The frame or bed of the automatic screw machine is indicated at 10, and 11 represents the carrier for the work holding jaws or clutch on the main spindle 12 of the automatic screw machine. The tool carrier and the means for operating it are not shown as they form no part of my present invention. It will, however, be understood that the various tools for performing the different operations on the rod or bar fed through the spindle 12 to form the articles desired are moved to and from the operative position automatically by suitable automatic controls on the machine, and the spindle 12 is driven in opposite directions by straight and cross belts on the pulleys 13 and 14 controlled by clutches 15 and 16 operated from the automatic control mechanism through the fork 17 in the well known manner. The control shaft is mounted on the side of the bed and is indicated at 18. It has suitable driving and control connections, not shown, with the remaining driving and operating mechanism of the machine.

My improved device is mounted on the bed of the machine, in the preferred construction laterally to one side of the main spindle 12 of the automatic screw machine. It includes a spindle 19 mounted in bearings 20 on a suitable bracket 21 secured to the bed. This shaft is driven by straight and cross belts on pulleys 22 and 23 through the clutches 24 and 25 mounted between them and shiftable to engage either one of these pulleys by the fork 26. This fork is pivoted at 27 and operated by a crank arm 28 connected by a link 29 to a lever 30 pivoted at 31 to the frame. This lever 30 carries a roller 30' running in a cam groove 32 in a cam 33 mounted on the shaft 18. By suitable lateral bends in the groove 32 the clutches 24 and 25 are shifted as the shaft 18 rotates and in certain timed relation with the other elements of the device, as will later be described. It will be understood the pulleys 22 and 23 are free to rotate on the spindle 19 while the clutch block 34 is splined to the spindle, as shown at 35, and thus drives the spindle 19.

The spindle 19 carries a suitable tool 36 performing a separate operation on the articles. In the present illustration the tool 36 is shown as a tap for tapping central holes in the articles 37 transferred from the automatic screw machine. The article 37 is illustrated as a battery nut for making electrical connections on batteries or binding posts, but this is used merely for the purpose of illustration as the device is by no means confined to use for tapping battery nuts or even for tapping operations as it may be used for countersinking, milling, drilling or the like as well as tapping.

In making battery nuts on the automatic screw machine ordinarily the nut is shaped and drilled through the center but is not tapped. In the present illustration I have shown my improved attachment as constructed for performing this tapping operation, although as above noted it is by no means limited to this operation. The nut leaves the screw machine in alignment with the axis of the spindle 12, and pivoted to the frame of the machine in suitable bearings 38 is a shaft 39 carrying a transfer lever 40. This lever carries a pin 41 which when the nut 37 is cut off is in the central drilled hole in this nut. Therefore, after the nut is cut off it is supported by this pin on the lever 40. This lever at that time is in the dotted line position of Fig. 3. Immediately after the nut is cut off the lever is swung laterally to the full line position of Figs. 2 and 3 bringing the nut 37 into alignment with the spindle 19 of the attachment. This operation is performed by suitable levers operated from cams mounted on the shaft 18.

The shaft 39 is embraced by a spring 42 which is secured at one end to the inner bearing 38 and at its opposite end to a collar 43 secured to the shaft 39 by any suitable means, as a set screw 44. This spring 42 is tensioned so that it tends to shift the shaft 39 longitudinally to the right, as viewed in Fig. 1, and also tends to turn this shaft in the bearings 38 to swing the transfer arm 40 to the dotted line position of Fig. 3 with the pin 41 in alignment with the spindle 12 of the screw machine. A lever 45 pivoted to the frame at 46 has a fork 47 embracing the shaft 39 and at its other end carries a roller 48 running on a cam 49 on the shaft 18. This lever when the roller is on the high part of the cam holds the shaft 39 in the left hand position but when the roller is on the lower part of the cam it permits the spring 42 to slide the shaft 39 and lever 40 to the right, as indicated in dotted lines, Fig. 1.

The shaft 39 also carries a block 50 secured thereto which has a fork 51 embracing a rod 52 carried on a lever 53 pivoted to the frame at 54. This lever carries a roller 55 running on a cam 56 on the shaft 18. This lever and cam when the roller 55 is on the high part thereof swings the shaft 39 and the arm 40 to the left, or counterclockwise as viewed in Fig. 3, to the full line position of this figure, bringing the pin 41 carried by the lever 40 into alignment with the spindle 19.

Mounted on the bracket 21 is a pair of supports 57 and 58. In the present showing they are secured to the forward bearing 20 by any suitable means, such as screws 59. This support 57 carries an adjustable jaw 60 which is slidable transversely of the spindle 19 in suitable guideways 61 and is held in adjusted position by a clamping screw 62 in an elongated slot 63. It will, of course, be understood that by loosening the screw 62 the jaw 60 may be adjusted to proper position and then clamped in this position by tightening the screw 62. On the opposite side of the axis of the spindle 19 is a slidable jaw 64, it being guided for reciprocatory movement in guides 65 in the support or bracket 58. It carries a pin 66 seating in a fork 67 on the lever 68 pivoted to the frame at 69, and this lever carries a roller 70 engaging a suitable cam 71 on the shaft 18. This jaw 64 is operated in certain timed relation with the operation of the other members of the device by the cam 71 through the lever 68 to clamp and release the element 37 being operated upon.

The spindle 19 may slide longitudinally to allow for the necessary movements of the tool 36, in the present instance, the tap. Secured to this spindle is a collar 72 having a groove 73 receiving rollers carried by the fork 74 pivoted to the frame at 75. A link 76 connects this fork with the lever 77 pivoted to the frame at 78 and carrying at its opposite end a roller 79 running on the face of the cam disc 80 mounted on the shaft 18. This disc carries a lug 81 which shifts the lever 77 in certain timed relation with the operation of the other devices.

The operation is as follows: Taking for example, the battery nut 37, it is turned and a central hole drilled while carried by the spindle 12 of the automatic screw machine. After the hole is drilled the cam 49 forces the shaft 39 and the arm 40 to the left, as viewed in Fig. 1, and inserts the pin 41 in the opening in the nut. The nut is then cut off from the rod and the cam 49 permits the arm 40 to be shifted to the right under the action of the spring 42. The cam 56 now operates the lever 53 to turn the shaft 39 swinging its free end to the left or counter-clockwise, as viewed in Fig. 3, to carry the nut 37 to a position in alignment with the spindle 19. The cam 49 then shifts the shaft 39 and the lever 40 to the left bringing the nut 39 to a position in front of the stationary jaw 60. The cam 71 now operates the lever 68 to force the movable jaw 64 inwardly and clamp the nut 37 against the jaw 60. The cam 49 now permits the lever 40 to be shifted outwardly or to the right as viewed in Fig. 1, to withdraw the pin 41 from the opening in the nut which is now held by the jaws 60 and 64. The lever 40 is now free to be operated at the proper time to swing back and receive the next nut from the automatic screw machine spindle 12.

The nut 37 held by the jaws 60 and 64 is now in position for the additional or auxiliary operation, such as tapping. As soon as this nut is clamped the cam 81 swings the lever 77 to shift the spindle 19 to the right and start the tap 36 in the opening in the nut 37, it being, of course, understood that the cam 33 operating through the lever 30 has already shifted the clutch block 34 so that the spindle 19 is rotating in the right direction. As soon as the tap 36 has travelled the proper distance into the nut 37 the cam 33 shifts the clutch block 34 to reverse the spindle 19 and withdraw the tap from the nut. The nut is now completed and the cam 71 permits the opening of the jaw 64 to release the nut and the jaws are in position to receive the next nut which is transferred to them from the automatic screw machine spindle 12 by means of the lever 40. The lever 68 is operated to release the jaw 64 by means of a suitable spring 82 connected at one end to this lever and the other end to this frame.

It will be apparent from the foregoing description that the articles requiring the additional operation, as for example, a nut to be tapped, is automatically transferred from the automatic screw machine to the attachment for performing the separate operation as fast as these elements are finished in the screw machine. The transfer lever receives them in the proper position and transfers them in the proper position to the attachment, and they are already cleaned of chips, and therefore, no cleaning operation is required and no separate arranging device is necessary. The speed of the automatic screw machine is not affected in any way as it operates to form the elements the same as it did before and the separate operation is performed just as rapidly as the articles are prepared. This attachment thus does away with the additional or so-called "second operation machine" and also does not require additional space in factories as it is in reality a part of the automatic screw machine.

Having thus set forth the nature of my invention, what I claim is:

1. In combination with an automatic machine having a spindle and one or more automatically operated tools associated therewith for performing certain operations on successive elements, a spindle mounted laterally at one side of said first spindle, a tool operated by said latter spindle for performing a given operation on the element, a transfer means for successively transferring the elements from the first spindle to alignment with the second spindle, a holding means for retaining the element in the latter position, said holding means including an adjustable clamp member, means to secure said adjustable clamp member in adjusted position, a movable clamp member to co-operate with the adjustable clamp member, and means for operating the movable clamp and the second spindle in certain timed relation with the operation of the transfer means.

2. In combination with an automatic screw machine having a spindle, a second spindle, work holding means adjacent the second spindle said work holding means including a stationary clamp member and a slidable clamp member co-operating with the stationary clamp member, means for receiving elements from the first spindle and transferring them to said holding means, a tool operated by the second spindle to perform an operation on the work held by the said holding means, and means for operating said second spindle and said slidable clamp in timed relation with the transfer means.

3. In combination with an automatic screw machine having a spindle, a second spindle, work holding means adjacent the second spindle including a reciprocating clamping jaw, a transfer lever mounted for swinging movement transversely of the spindles and also movement longitudinally thereof, means associated with the second spindle for performing an operation on an element held by the holding means, and means for operating said transfer lever, said second spindle and said reciprocating clamping jaw in certain timed relation with the operation of the screw machine.

4. In combination with an automatic screw machine having a spindle and a control shaft, a longitudinally slidable spindle spaced laterally from the first spindle, a work holder adjacent the second spindle, a tool carried by the second spindle, a longitudinally shiftable shaft, a transfer lever mounted on said shaft, cams on the control shaft for sliding and turning said transfer shaft to transfer work from the first spindle to the work holder, and means on the control shaft for controlling the operation of the second spindle.

5. In combination with an automatic screw machine having a work spindle, a second spindle located laterally to one side of the first spindle and mounted for longitudinal movement, means for operating the second spindle in opposite directions, a tap carried by said latter spindle, a work holder associated with said second spindle including a movable jaw, a shaft mounted for sliding and turning movements, a transfer lever carried by said shaft, a pin on said lever adapted to thread into a drilled hole in an element formed on the screw machine, means for shifting and rocking said shaft to transfer the drilled articles from the first spindle to the movable jaw in timed relation with the transfer lever, means for operating the holder, and means for operating the second shaft.

6. In combination with an automatic screw machine having a work spindle and a control shaft, a second spindle located laterally to one side of the first spindle and mounted for longitudinal movement, means for operating the second spindle in opposite directions, a tap carried by said latter spindle, a work holder associated with said second spindle including a movable jaw, a transfer device capable of transferring drilled elements from the first spindle to the work holder, and cams on the control shaft for operating the second shaft, the transfer device and the movable jaw in timed relation with the first spindle and with each other.

7. In combination with an automatic screw machine having a spindle, a second spindle, work holding means adjacent the second spindle comprising an adjustable stationary jaw and a slidable jaw, means for receiving elements from the first spindle and transferring them to between said stationary jaw and said slidable jaw, a tool operated by the second spindle to perform an operation on the work held between stationary jaw and the slidable jaw, and means for operating the second spindle and the slidable jaw in timed relation with each other and with the transfer means.

8. In combination with an automatic screw machine having a spindle and a control shaft, a longitudinally slidable spindle spaced laterally from the first spindle, a work holder adjacent the second spindle including a movable jaw and a stationary jaw, a tool carried by the second spindle, a longitudinally shiftable shaft, a transfer lever mounted on said shaft and cams on the control shaft for sliding and turning said transfer shaft to transfer work from the first spindle to a position between the movable and stationary jaws, means for operating the movable jaw in timed relation to the transfer means, and means for controlling the operation of the second spindle.

In testimony whereof I affix my signature.

EDWIN S. INGRAHAM.